US008529810B2

(12) United States Patent
Guo

(10) Patent No.: US 8,529,810 B2
(45) Date of Patent: Sep. 10, 2013

(54) METHOD OF MAKING A PATTERN ON A BUILDING ON SITE

(75) Inventor: Silong Guo, Shanghai (CN)

(73) Assignee: Qiangle Energy-Saving Materials Co. Ltd., Shanghai (CN)

( * ) Notice: Subject to any disclaimer, the term of this patent is extended or adjusted under 35 U.S.C. 154(b) by 294 days.

(21) Appl. No.: 12/627,167

(22) Filed: Nov. 30, 2009

(65) Prior Publication Data

US 2010/0219554 A1 Sep. 2, 2010

Related U.S. Application Data

(63) Continuation of application No. PCT/CN2007/070546, filed on Aug. 23, 2007.

(30) Foreign Application Priority Data

May 29, 2007 (CN) .......................... 2007 1 0041365

(51) Int. Cl.
*B32B 3/26* (2006.01)

(52) U.S. Cl.
USPC ........................................ 264/135; 101/128.1

(58) Field of Classification Search
USPC ........................................ 264/135; 101/128.1
See application file for complete search history.

(56) References Cited

U.S. PATENT DOCUMENTS

| | | | | | |
|---|---|---|---|---|---|
| 2,110,335 | A | * | 3/1938 | Kritzer | 427/264 |
| 2,549,017 | A | * | 4/1951 | Saffir | 523/209 |
| 2,595,142 | A | * | 4/1952 | Herck | 264/31 |
| 3,438,795 | A | * | 4/1969 | Schroeder et al. | 106/254 |
| 5,460,087 | A | * | 10/1995 | Ogorzalek | 101/128.21 |

* cited by examiner

*Primary Examiner* — Yogendra Gupta
*Assistant Examiner* — John Robitaille
(74) *Attorney, Agent, or Firm* — Levenfeld Pearlstein, LLC

(57) ABSTRACT

The invention provides a method of making a pattern on a building on site, which comprises following steps: applying a base coat on a surface of said building; pressing and adhering a pattern mold onto said base coat before initial setting of said base coat so as to form a compound body of the base coat and the pattern mold; applying a cover coat on said compound body; releasing the mold so as to obtain said pattern. The decoration method of the invention makes the wall surface safe and solid, of a long service life, available of a variety of patterns and convenient to construct.

9 Claims, 2 Drawing Sheets

METHOD OF MAKING A PATTERN ON A BUILDING ON SITE

CROSS REFERENCE TO RELATED APPLICATION(S)

This application is a continuation of International Patent Application No. PCT/CN2007/070546 filed Aug. 23, 2007, which claims priority to Chinese Application No. 200710041365.9, filed on May 29, 2007, the entire contents of both of which are incorporated herein by reference.

TECHNICAL FIELD

This invention relates to the technical field of building material construction and in particular, to a method of making a pattern on a building on site.

BACKGROUND OF THE INVENTION

In general, existing building wall surface decoration are made by bonding wall ties to walls by means of a bonding coat (e.g. mortar). In such a technique, there exist the technical problems of low construction speed, heavy dead weight of wall surface decoration layer, potential safety problem of falling wall tiles, etc. The frequent occurrence of exterior wall tile dropping has drawn more and more attentions to the safety of wall tile decoration. In the mean time, wall decoration cannot provide a variety of options due to limited patterns and colors available for wall tiles. Another kind of building wall surface decoration uses exterior wall coating decoration applied by spray coating or brush rolling. Disadvantages of this technique are limited pattern options and difficulty in applying complicated patterns.

As building energy conservation technology becomes more and more popular, external insulation systems for exterior walls have been developed vigorously. However, the potential safety problem on a long term basis in applying wall tiles in an exterior wall's external insulation system was test-verified. Since 1985, the Fraunhofer Research Institute in Holzkichen, Germany, had conducted long-term experiments on paving ceramic wall tiles in external insulation system. The site of the experiments were test walls and houses exposed to atmospheric environment. After about 10 years, the ceramic tiles on the test walls peeled off over a large area. Following conclusions are made based on the experiments made by the Fraunhofer Institute:

(1) Potential quality problem of the applied ceramic tiles will only occur after a long period of time (about 10 years).

(2) Enhancing waterproof protection may extend their service life.

(3) A bonding coat under the ceramic tile must be a coat with a specific mechanical strength and hydrophobic performance. And, mineral-based lightweight face coat is not suitable for this application.

To overcome these problems, technicians in this field extend the service life (prevent peeling) of paved ceramic tiles by applying waterproof protection and enhancing bonding strength. For instance, Professor Zhang Yongming, Tongji University, China proposed that each aspect of pavement of ceramic tiles for an external insulation system, including material and process, should be addressed and emphasized the control of deadweight of ceramic tile preferably at 20 $kg/m^2$ or below and the enhancement of performance of the bonding material. Disadvantages of these methods lie in that special requirements are raised for the performance of ceramic tiles and bonding material and potential long-term quality problem still exists since it's difficult to control the construction process.

FIG. 1 indicates an existing external insulation system using bonded ceramic wall tiles. The entire process includes: handling a base wall 3—pasting insulation material 8 by means of adhesive material 9—applying a base coat 2 with mesh fabrics—fixing anchor bolts 12—applying a ceramic tile bonding coat 11—paving ceramic tiles 10—filling seams 13.

There are also some other methods. For instance, in Chinese patent CN2849002Y, grooves are provided on the back of a tile so as to enhance bonding strength of wall tile. This method, however, still involves risk of peeling and it introduces an additional procedure, increasing the cost of production.

In conclusion, in this field, there is a need for a method of wall surface decoration on a buildings that provides a wall surface which is safe and solid, of a long service life, available of a variety of patterns and convenient to construct.

SUMMARY OF THE INVENTION

An object of the invention is to provide a method of make wall decoration on a building which makes the wall surface safe and solid, of a long service life, available of a variety of patterns and convenient to construct.

The invention, on the one hand, provides a method of making a pattern on a building on site comprising following steps:

applying a base coat on a surface of said building;

adhering a pattern mold onto said base coat before initial setting of said base coat so as to form a compound body of the base coat and the pattern mold;

applying a cover coat on said compound body; and releasing the mold so as to obtain said pattern.

In a preferred embodiment of the invention, the composition of said base coat and/or cover coat comprises inorganic and/or organic cementing material, filler, additives and aggregate.

In a preferred embodiment of the invention, said pattern mold is a tabular through-carved (or hollowed-out) mold.

In a preferred embodiment of the invention, the thickness of said pattern mold is 0.3~3 mm.

In a preferred embodiment of the invention, said pattern mold has a front side and a back side, wherein said back side is in contact with said base coat and there exists adhesion between said back side and said base coat.

In a preferred embodiment of the invention, the back side of said pattern mold is a smooth surface; and/or the front side of said pattern mold is a smooth surface.

In a preferred embodiment of the invention, said pattern mold is a double-sided film-covered paper mold, wherein the back side and/or the front side of said paper mold is provided with a cover film with a smooth surface.

In a preferred embodiment of the invention, said pattern mold presents a flexural deformability during the mold releasing.

In a preferred embodiment of the invention, said base coat and/or cover coat are/is made obtained through multiple-pass application.

In a preferred embodiment of the invention, one or more layers of coat(s) is/are applied on said pattern.

BRIEF DESCRIPTION OF THE DRAWINGS

FIG. 2 is a diagram of a method of making a pattern on site according to this invention, wherein FIG. 2*a* is a schematic front view of a pattern mold and FIG. 2*b* is a schematic side view after mold releasing.

DETAILED DESCRIPTION OF THE PREFERRED EMBODIMENT

Figure 1:
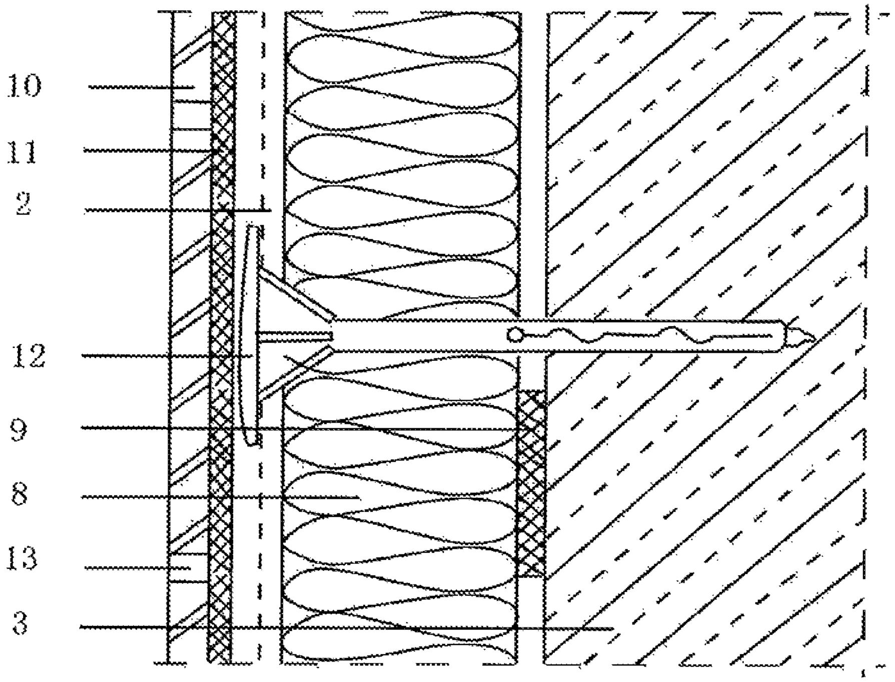
Figure 1 Prior Art
FIG. 1 shows an externally insulated wall surface of the prior art, with ceramic tiles paved on said wall surface.

Through extensive, in-depth research, the inventor devises a method of making a pattern on a building on-site by improving the preparing process. In this method, a base coat is applied on a surface of said building; a pattern mold is pressed and adhered onto said base coat before initial setting of said base coat so as to form a compound body of the base coat and the pattern mold; a cover coat is applied on said compound body; and the mold is released so that said pattern is obtained, thus making the wall surface safe and solid, of a long service life, available of a variety of patterns and convenient to construct. Therefore, this invention is accomplished.

As used herein, said "building surface" refers to a wall surface or a top surface, etc. of a building, e.g. an exterior wall, an interior wall, a ceiling, etc., unless otherwise specified. Said wall surface may be an insulation wall or a regular wall surface.

As used herein, said "base coat" refers to one or more layers of coat (e.g. mortar) in direct contact with building surface, unless otherwise specified. For the one or more layers of coat, each layer may be formed through one-pass or multiple-pass application.

As used herein, said "cover coat" refers to one or more layers of coat in direct contact with the compound body of the base coat and the pattern mold, unless otherwise specified. For the one or more layers of coats, each layer may be formed through one-pass or multiple-pass application.

As used herein, said "pattern mold" means that said mold presents a patterned structure, unless otherwise specified. For instance, said patterned structure consists of through-carved designs.

As used herein, said "tabular through-carved mold" means that said mold has a tabular structure and said mold contains through-carved designs (e.g. through-carved holes) thereon, said through-carved designs constituting the shape of the pattern, unless otherwise specified. Said tabular structure is usually a planar structure with a specific thickness, which is dependent upon requirement (e.g. 0.3~3 mm).

Further description are provided as follows for all aspects of the invention.

Base Coat

There is no specific restriction on the composition of the base coat in this invention, as long as this has no adverse effect on the object.

For instance, the composition of the base coat may comprise cementing material, filler, additives and aggregate. Said cementing material may be inorganic and/or organic cementing material.

There is no specific restriction on the inorganic cementing material in this invention, and for instance, cement, gypsum, lime, sodium silicate, etc. can be used as long as this has no adverse effect on the object. There is no restriction on dosage of such inorganic cementing material as long as this has no adverse effect on the object.

There is no specific restriction on the organic cementing material in this invention as long as this has no adverse effect on the object. Regular organic cementing materials in this field may be used, for instance, commercially available organic cementing materials, in particular, such as resins. There is no restriction on dosage of such organic cementing material as long as this has no adverse effect on the object. Said organic cementing material may also be mixed with inorganic cementing material. There is no specific restriction on the mixing ratio as long as this has no adverse effect on the object.

There is no specific restriction on the filler in this invention as long as this has no adverse effect on the object. For instance, mountain flour, fiber, etc. commonly used in this field can be used. There is no restriction on dosage of the filler as long as this has no adverse effect on the object.

There is no specific restriction on the additives in this invention as long as this has no adverse effect on the object. More specifically, the additives may be: performance-improving additives commonly used in this field, in particular, such as polymer gelatin powder, cellulose ether or their combinations; additives for changing appearance features of a building commonly used in this field, such as pigment; or luminescent powder, metal particles, shell particles or their combinations. There is no restriction on dosage of the additives as long as this has no adverse effect on the object.

There is no specific restriction on the aggregate in this invention as long as this has no adverse effect on the object. Coarse aggregate, fine aggregate or their combinations can be used. More specifically, for instance, coarse aggregates commonly used in this field include quartz rock, granite, andesite etc. Fine aggregates commonly used in this field include quartz sand, natural fluvial sand, etc. When the coarse and fine aggregates are used in combination, there is no specific restriction on their combination ratio, as long as this has no adverse effect on the object.

In this invention the base coat may also be added with other substances, for instance, filler, more specifically, a preformed fiber structure, such as mesh cloth. There is no specific restriction on raw fiber material of said mesh cloth as long as this has no adverse effect on the object.

There is no specific restriction on the thickness of the base coat in this invention as long as this has no adverse effect on the object. Preferably, the thickness of said base coat is greater than the thickness of the pattern mold. More preferably, the thickness of said base coat is greater than the thickness of the pattern mold by 1~4 mm.

Pattern Mold

The thickness of the pattern mold in this invention is dependent on construction requirement and it is usually smaller than the thickness of the base coat. More specifically, the value may be, for instance, 0.3~3 mm and preferably, 1±0.5 mm.

There is no specific restriction on the through-carved designs of the pattern mold in this invention as long as this has no adverse effect on the object. The through-carved designs may be dependent on the shape constituting the pattern, for instance, being of tile shape, cobble shape, geometric graphics, flower forms, etc.

Preferably, said graphical mold allows flexural deformation upon releasing (e.g. breaking) of the mold. The advantages lies in that the mold releasing resistance can be reduced. For instance, film-coated paper, plastics, etc. may be used. There is no specific restriction on the degree of said flexural deformation as long as this has no adverse effect on the object.

Preferably, said pattern mold in this invention has a front side and a back side, wherein said back side contacts said base coat and there presents adhesion between said back side and said base coat. More preferably, the back side of said pattern mold is a smooth surface and/or the front side of said pattern mold is a smooth surface. Most preferably, said pattern mold is a double-sided film-covered paper mold, wherein a film with a smooth surface is provided on the back side and/or front side of said paper mold. There is no specific restriction on the smoothness of the back side (the smoothness of the back side covering film, in the preferred embodiment) of said pattern mold as long as the smooth surface and the coat possess desired adhesion. The desired adhesion is dependent upon engineering requirement. There is no specific restriction on the smoothness of the front side (the smoothness of the front side covering film, in the preferred embodiment) of said pattern mold as long as the application of the cover coat becomes smoother (i.e. the sliding friction between the applying tool and applied cover coat is reduced). There is no specific restriction on the extent of friction reduction, which is dependent on engineering requirement.

More specifically, for instance, the material of a pattern mold is preferably a kind of material that is smooth and flat before being pressed and adhered and allows flexural deformation upon releasing (breaking) of the mold.

An advantage of the pattern mold according to this invention lies in that the smooth back side of a mold adheres tightly onto a wet base coat when the mold is being pressed into the wet base coat. In a preferred embodiment of the invention, the smooth surface of the front side makes the application of the cover coat smoother.

Cover Coat

There is no specific restriction on the composition of said cover coat as long as this has no adverse effect on the object. The composition may be the same as or different from that of base coat.

More specifically, the composition of the cover coat in this invention may comprise cementing material, filler, additives and aggregate. Said cementing material may be inorganic and/or organic cementing material.

There is no specific restriction on the inorganic cementing material in this invention, and for instance, cement, gypsum, lime, sodium silicate, etc. can be used as long as this has no adverse effect on the object. There is no restriction on dosage of such inorganic cementing material as long as this has no adverse effect on the object.

There is no specific restriction on the organic cementing material in this invention as long as this has no adverse effect on the object. Regular organic cementing materials in this field may be used, for instance, commercially available organic cementing materials, in particular, such as resins. There is no restriction on dosage of such organic cementing material as long as this has no adverse effect on the object. Said organic cementing materials may also be mixed with inorganic cementing materials. There is no specific restriction on the mixing ratio as long as this has no adverse effect on the object.

There is no specific restriction on the filler in this invention as long as this has no adverse effect on the object. For instance, mountain flour, fiber, etc. commonly used in this field can be used. There is no restriction on dosage of the filler as long as this has no adverse effect on the object.

There is no specific restriction on the additives in this invention as long as this has no adverse effect on the object. More specifically, the additives may be: performance-improving additives commonly used in this field, in particular, such as polymer gelatin powder, cellulose ether or their combinations; additives for changing appearance features of a building commonly used in this field, such as pigment; or luminescent powder, metal particles, shell particles or their combinations. There is no restriction on dosage of additives as long as this has no adverse effect on the object.

There is no specific restriction on the aggregate in this invention as long as this has no adverse effect on the object. Coarse aggregate, fine aggregate or their combinations can be used. More specifically, for instance, coarse aggregates commonly used in this field include quartz rock, granite, andesite etc. Fine aggregates commonly used in this field include quartz sand, natural fluvial sand, etc. When the coarse and fine aggregates are used in combination, there is no specific restriction on their combination ratio, as long as this has no adverse effect on the object.

There is no specific restriction on the thickness of the cover coat in this invention as long as this has no adverse effect on the object.

Method of Making a Pattern On Site

The method of making a pattern on a building on site according to the invention comprises following steps: applying a base coat on a surface of said building; pressing and adhering a pattern mold onto said base coat before initial setting of the base coat so as to form a compound body of the base coat and the pattern mold, and then applying a cover coat on said compound body; removing said mold by releasing it so as to obtain said pattern. There is no specific restriction on degree of setting of said compound body and such a compound body may be a compound body obtained before or after the initial setting of the base coat, and preferably be a compound body obtained before initial setting of the base coat.

The applicant finds that the bonding performance of the pattern is enhanced if the compound body produced before the initial setting of base coat is used to be applied with a cover coat. In a preferred embodiment of the invention, according to experimental results, it shows that a pattern mold can be reliably and accurately secured for at least 5 h in a high temperature (an atmospheric temperature of 35□), gale weather (gust Grade-6) environment without separation or peeling of the mold from the base coat. And the accurate and reliable securing, at the same time, can ensure intactness of the pattern upon mold releasing.

The method of making a pattern on site according to the invention may be applied to all kinds of building surfaces, e.g. a regular exterior wall, an insulation exterior wall, a ceiling, etc. The method of making a pattern on site according to the invention may be applied to all kinds of insulation exterior walls. There is no restriction on the procedure of fabricating said insulation exterior walls and a variety of procedures can be used, which, for instance, include: pasting polystyrene foam board onto an exterior wall using adhesive material and then applying a base coat with built-in mesh cloth onto the board (said foam board may also be fixed by anchor bolts); or applying an insulation coat (e.g. polyphenyl granule adhesive cement) onto an exterior wall.

There is no specific restriction on the initial setting time of the base coat in the invention as long as the base coat is of plasticity. Preferably, initial setting time of said base coat is adjustable based on construction requirement. More preferably, the time may be within 30 minutes after the application of the base coat.

Preferably, the step of pressing and adhering of said pattern mold is performed before the initial setting of the base coat. More specifically, for instance, the pressing and adhering is preformed within 30 minutes after the application of the base coat.

There is no specific restriction on the application step of said cover coat mortar as long as the mortar is applied onto the compound body of the base coat and the pattern mold. The step may be performed before or after the initial setting of the base coat. Preferably, the application step of said cover coat is performed before the initial setting of the base coat.

There is no specific restriction on the way of application in the invention as long as this has no adverse effect on the object. More specifically, for instance, spray coating, scraping, etc. may be used.

Said base coat and/or cover coat may be obtained through one-pass or multiple-pass application. Preferably, said base coat and/or cover coat is obtained through multiple-pass application. Said multiple-pass application includes two-pass or more than two-pass application. The applicant finds that by multiple-pass (two or more pass) applications, bleeding of the base coat out of the cover coat was eliminated.

There is no specific restriction on the way of the pressing and adhering of the pattern mold in the invention as long as this has no adverse effect on the object. Usually, only part of the mold is to be pressed and adhered onto the base coat. More specifically, for instance, a spatula may be used for the pressing and adhering.

There is no specific restriction on the way of mold releasing and the release time as long as this has no adverse effect on the object. More specifically, for instance, the mold is be peeled off or torn away after the setting of the base coat, obtaining a smooth releasing surface. If a rough releasing surface is needed, the releasing may be performed before the setting of the base coat. Since said roughness is in inversely proportional to the release time, the release time can be determined based on required roughness.

One or more layers of exterior coat(s) may be applied on said pattern. There is no specific restriction on the type and the number of the layers of said exterior coat(s) as long as this has no adverse effect on the object. The type and the number of layers of said exterior coats may be the same as or different from those of said cover coat and/or base coat. More specifically, for instance, such exterior coat is a transparent one or an opaque one.

Said method of making a pattern on site may also include other step as long as this has no adverse effect on the object. For instance, the wall surface may be scraped before the application of the base coat, or facing may be applied on the cover coat, more specifically to form a texture facing configuration such as smooth surface, rough surface, or semi-smooth surface, etc.

Technical Effects

Advantages of this Invention Include:

(1) Considering existing methods of paving wall tile, deadweight of ceramic tile is 15 kg~20 kg per square meter and deadweight of lightweight wall tile is 10 kg~15 kg per square meter. The invention, however, need no wall tiles, so the deadweight of the wall tile decoration system, which is 10 kg~20 kg/m$^2$, can be reduced.

(2) The pattern mold used in the invention can be secured on the base coate conveniently, accurately and reliably. In an embodiment of the invention, mechanical gripping and adhesion effect are produced between the double-sided film-covered paper mold and the base coat so that the mold can be fixing onto the base coat more accurately and reliably.

(3) The pattern mold used in the invention can smooth the application of the cover coat so as to ensure convenient, reliable and accurate fixation of the mold on the wall surface.

(4) The wet adhering method used in the invention (that is to say, the step of pressing and adhering the pattern mold is performed before the initial setting of the base coat) can substantially improve the reliability and accuracy of the fixing of the pattern mold. In an embodiment of the invention, according to experimental results, it shows that a pattern mold made through the wet adhering method can be reliably and accurately secured for at least 5 h in a high temperature (an atmospheric temperature of 35° C.), gale weather (gust Grade-6) environment without separation or peeling of mold from the base coat. The accurate and reliable securing, at the same time, can ensure intactness of the pattern upon mold releasing.

(5) In this invention, the pattern mold can be devised into a variety of decorative designs so as to make various decorative landscaping decorative patterns on a wall surface conveniently and quickly. The system finds wide applications on interior and exterior wall decoration, enclosing walls, jigsaw fresco, etc. and can produce a variety of decorative effects when combining with some surface coat (e.g. metallic paint).

Other aspects of the invention will be obvious to a person skilled in this field in view of the disclosure herein.

The invention is further entailed with reference to following embodiments. It should be understood that these embodiments are used for construing the invention only, but not limiting its scope. Where a detailed condition of an experimental method is not specified herein, a regular experimental condition or a condition recommended by a manufacturer will usually be taken.

Unless otherwise defined or specified, all technical and scientific terms used herein are of the identical meaning as those known by a person skilled in this field. In addition, any method or material similar or equivalent to those disclosed herein may be used in this invention.

Embodiments

Figure 2:
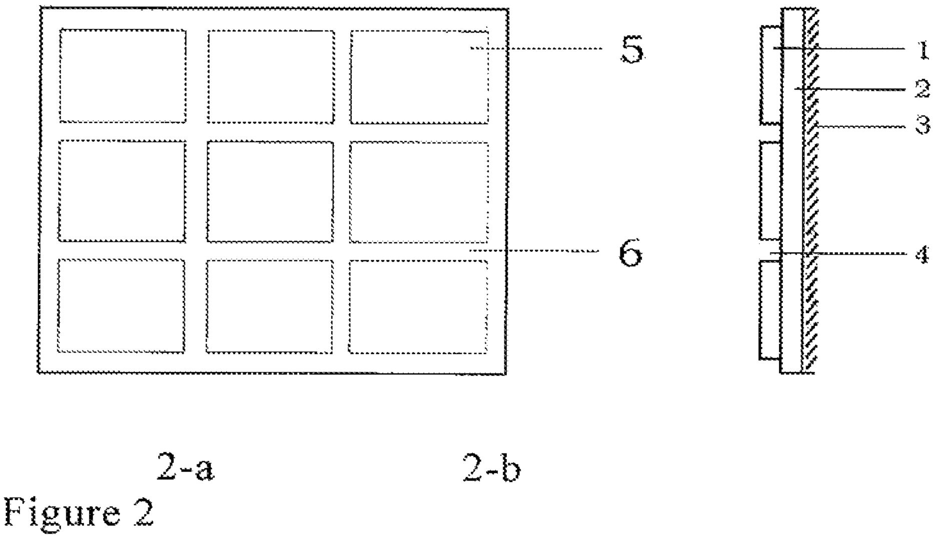

FIG. 2*a* is a schematic front view of a pattern mold and FIG. 2*b* is a schematic side view upon mold releasing. As shown in FIGS. 2*a* and 2*b*, a layer of base coat 2 is applied onto a base wall 3 on a surface of a building (in this embodiment, the base coat has a thickness of 2~6 mm). The color of the base coat 2 is prepared to be that of tile seams 4 between the patterns.

The pattern mold 6 which is prefabricated with an ornamental tile pattern is paved according to the pattern design on the wet base coat 2 (before initial setting). In this embodiment, the mold is a double-sided film-covered paper mold of a thickness of 1 mm (the thickness of the mold can be determined as desired). The surface of the mold 6 in contact with the base coat 2 is a smooth surface and said mold 6 has through-carved portions 5. The surface of the ornamental tile pattern mold 6 is pressed and adhered using a spatula, securing the back side of the ornamental tile pattern mold 6 into the base coat 2. At this moment, portions of the base coat 2 are filled into the through-carved portions 5 and the extent of the filling may be adjusted as desired. In this embodiment, it is filled so that the filled portions are level with the front side of the ornamental tile pattern mold 6, obtaining a compound body of the base coat 2 and the pattern mold 6. A cover coat 1 is applied on the compound body of the base coat 2 and the ornamental tile pattern mold 6. The cover coat 1 is covered all over the compound body of the base coat 2 and the ornamental tile pattern mold 6. The thickness of the base coat 1 is dependent upon the depth of the tile seam. The color of the cover coat 1 is prepared to be that of tiles. In other embodiments, the finished surface of the cover coat 1 may be further subjected to surface shaping according to design requirement, for instance, roughening, knurling, etc.

When the cover coat 1 is dried with no dissociative moisture on its surface, the ornamental tile pattern mold 6 is peeled off so as to produce a decorative facing with an ornamental tile pattern. FIG. 4 shows the tile seams.

In other embodiments, various coats may be applied on the complete pattern (e.g. ornamental tile pattern) as desired.

The invention adopts the wet adhering method in which one layer of a base coat of about 2~6 mm (the base coat consists of inorganic and/or organic cementing material, filler, additives (including pigment) and aggregate) is applied on base wall before initial setting of the base coat, usually within 30 minutes after the application of the base coat, so as to press and adhere the pattern mold with an ornamental tile or other pattern onto the base coat and accurately fix the same. It is preferable that such a pattern mold with an ornamental tile or other pattern is a kind of economical, completely flat composite paper mold used for cast-in-situ decorative concrete facing, the structure of which (of a thickness less than 3 mm and preferably about 1 mm) facilitates accurate and reliable fixation in the wet base coat. The smooth back side cover film adjacent to the base coat presents good adhesion with respect to the base coat, and the smooth cover film on the front side facilitates the pressing of a spatula on the completely flat composite paper mold and makes the application of the cover coat quite smooth. The thickness of about 1 mm facilitates the in-press of the completely flat composite paper mold into the base coat. The mechanical gripping and adhesion effect between the completely flat composite paper mold and the base coat brought by pressing secures the paper mold reliably, accurately and conveniently in the base coat. According to experimental results, through the wet adhering method, a completely flat composite paper mold can be accurately and reliably secured for at least 5 h in a high temperature (an atmospheric temperature of 35□), gale weather (gust Grade-6) environment without separation or peeling of the paper mold from the base coat. Since the application of the cover coat already starts when the pressed completely flat composite paper mold enters into the base coat, there is sufficient time for applying the cover coat.

Comparing with existing ways of paving ceramic tiles, according to experimental and testing results, a thickness resulting from applying a bonding coat on both sides (wall and back side of a ceramic tile) using reliable Floating—Buttering method is substantially equal to a total thickness of the base coat and the cover coat according to this invention, that is, deadweight of the ceramic tile is equal to the deadweight of the wall tile ornamental system which is reduced by the system of the present invention. Generally, the deadweight per square meter of ceramic tiles is 15~20 kg and the deadweight per square meter of lightweight wall tiles is 10~15 kg. Therefore, with the invention, the wall tile ornamental system deadweight of 10~20 kg/m$^2$ can be reduced.

In another embodiment of the invention, a cover coat is applied before initial setting of a base coat, achieving their integral bonding which is of high security. The wall surface system presents long-term stability and safety and also convenient to construct.

In a further embodiment of the invention, said base coat and cover coat are applied through multiple passes. The applicant finds that multiple-pass application (two or more passes) may eliminate bleeding of the base coat out of the cover coat.

Figure 3:
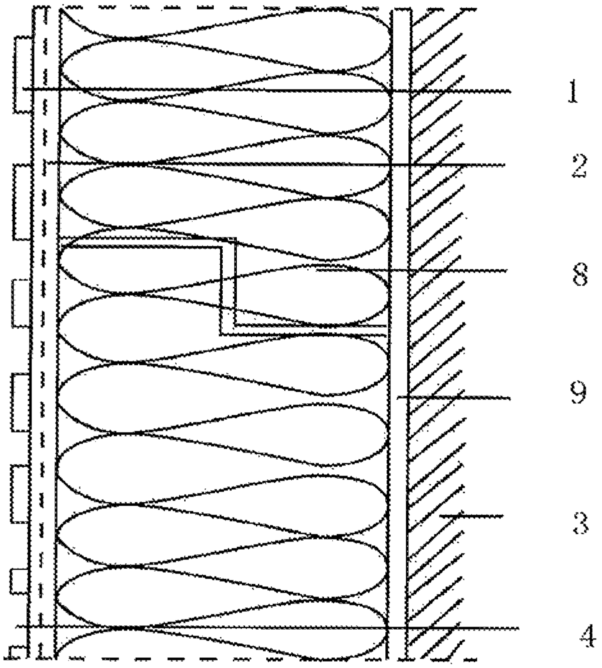
FIG. 3 shows an embodiment of the method of making a pattern on site according to this invention, said pattern being fabricated on site on externally insulated exterior wall.

A further embodiment of the invention is shown in FIG. 3. The entire process is as follows: handling a base wall 3—pasting insulation material 8—applying a base coat 2 with mesh fabrics (the color of the coat is that of the seams of ornamental tiles or the like)—pressuring and adhering a pattern mold with an ornamental tile pattern or the like onto the wet base coat 2 (not shown in the figure)—applying a cover coat 1 on the pattern mold with an ornamental tile pattern or the like (the color of the coat is that of tiles or similar blocks)—releasing the pattern mold with an ornamental tile pattern or the like after the cover coat 1 dries up—applying a required coat.

For comparison, the inventor makes an ornamental tile facing by a method comprising: pasting pattern molds by means of a double-sided adhesive tape on a dry base wall. Both of a spot pavement method and a full pavement method are used. The spot pavement method leaves seams between the mold and the dry wall and thus mortar leak and burr intends to occur during the application of the cover coat, compromising the whole appearance of the patterned facing such as an ornamental tile pattern or the like. The full pavement method is labor- and time-consuming and is difficult to completely pave a mold with complicated patterns (e.g. curved flower pattern) since the double-sided adhesive tape is distributed lineally, also compromising the whole appearance of the patterned facing such as an ornamental tile pattern or the like and retarding construction progress.

The methods of making a pattern on site according to embodiments of this invention are only examples of the method of the invention. According to the above-said embodiments, a person skilled in this field may make a pattern on site by adapting various methods or by combining them with prior art. The finished patterns may be further decorated or protected by applying a protective layer, coloring, etc.

All documents cited in this invention are incorporated in this application by reference, just like each of them being cited as a reference. In addition, it should be understood that, from the above disclosure of this invention, a person skilled in this field is capable of making various changes or modifications to the invention and all of these equivalent should still fall into the scope defined by attached claims.

The invention claimed is:

1. A method of making a pattern on a building on site comprising the steps of:

applying a base coat on a surface of said building;

tightly adhering a back side of a tabular through-carved pattern mold onto said base coat before initial setting of said base coat, when the base coat is wet, so as to form a compound body of the base coat and the pattern mold, the thickness of said base coat being greater than a thickness of said pattern mold by about 1 to about 4 millimeters, portions of said base coat being filled in through said through-carved portions;

applying a cover coat on said compound body, portions of said cover coat having a thickness at least as great as the thickness of the pattern mold; and releasing the mold so as to obtain a 3-dimensional pattern, wherein one or both of said base coat and said cover coat are applied in at least a two-pass application.

2. The method according to claim 1, wherein the composition of said base coat and/or cover coat comprises cementing material, filler, additives, aggregate and combinations thereof, wherein said cementing material includes cement, gypsum, sodium silicate, resins and combinations thereof, wherein said filler includes mountain flour or fiber, wherein said additives include pigment, metal particles, and combinations thereof, and said aggregate includes quartz rock, granite, andesite, and quartz sand, wherein said base coat includes a preformed fiber structure filler.

3. The method according to claim 1, wherein said pattern mold is a tabular through-carved mold defining through-carved portions, wherein the thickness of said base coat is greater than a thickness of said pattern mold by about 1 to about 4 millimeters, and wherein the surface of said pattern mold pressed and adhered to the surface of said base coat, and portions of said base coat are filled in through said through-carved portions, and wherein a back side of said pattern mold adheres tightly to the base coat when the base coat is wet and when the mold is pressed into the wet base coat.

4. The method according to claim 1, wherein the thickness of said pattern mold is about 0.3 to about 3 mm.

5. The method according to claim 1, wherein said pattern mold has a front side and a back side, wherein said back side is in contact with said base coat and there presents adhesion between said back side and said base coat, and wherein said pressing and adhering is performed within about 30 minutes after applying said base coat, and wherein mechanical gripping and adhesion secure the mold and base coat to one another.

6. The method according to claim 5, wherein the back side of said pattern mold is a smooth surface; and/or the front side of said pattern mold is a smooth surface, to reduce sliding friction between the front side of said pattern mold and applying the cover coat.

7. The method according to claim 5, wherein said pattern mold is a double-sided film-covered paper mold, and wherein the back side and/or the front side of said paper mold is provided with a cover film with a smooth surface.

8. The method according to claim 1, wherein said pattern mold presents a flexural deformability during the mold breaking.

9. The method according to claim 1, wherein one or more layers of exterior coat(s) is/are applied on said pattern.

* * * * *

UNITED STATES PATENT AND TRADEMARK OFFICE

CERTIFICATE OF CORRECTION

PATENT NO. : 8,529,810 B2
APPLICATION NO. : 12/627167
DATED : September 10, 2013
INVENTOR(S) : Silong Guo It is certified that error appears in the above-identified patent and that said Letters Patent is hereby corrected as shown below:

In the Specification

Column 1, line 42, “Holzkichen,” to read as --Holzkirchen,--.

Column 6, line 33, “35□),” to read as --35° C.),--.

Column 7, line 51, “base coate” to read as --base coat--.

Column 9, line 28, “35□),” to read as --35° C.),--.

Signed and Sealed this
Eighteenth Day of November, 2014

Michelle K. Lee

*Deputy Director of the United States Patent and Trademark Office*